United States Patent [19]
Rapp

[11] 3,947,089
[45] Mar. 30, 1976

[54] LEAD-BISMUTH GLASSES FOR ACOUSTOOPTIC AND MAGNETOOPTIC DEVICES

[75] Inventor: James E. Rapp, Oregon, Ohio
[73] Assignee: Owens-Illinois, Inc., Toledo, Ohio
[22] Filed: May 5, 1975
[21] Appl. No.: 574,381

[52] U.S. Cl. ............... 350/151; 106/47 Q; 106/49; 350/96 M; 350/149
[51] Int. Cl.² .................... C03C 3/12; G02B 1/00
[58] Field of Search ............... 106/47 Q, 47 R, 49; 350/96 WG, 149, 151

[56] References Cited
UNITED STATES PATENTS
2,853,393   9/1958   Beck et al. ........................ 106/53 X
3,810,688   5/1974   Ballman et al. ................. 350/96 WG

OTHER PUBLICATIONS

Chem. Abstracts 81 (143 393p), "Magnetic Susceptibility of Germanium Dioxide ($GeO_2$)–Lead Oxide (PbO)–Boron Oxide ($B_2O_3$) System Glasses".
Sirota, N. N. et al., "Refractive Index of Germanium–Lead–Borate Glasses," Vestsiakad. Navuk Belarus, SSR, Ser Fiz–Mat. Navuk, 1969 (5), pp. 121-123.

*Primary Examiner*—Helen M. McCarthy
*Attorney, Agent, or Firm*—Howard G. Bruss, Jr.; E. J. Holler

[57] ABSTRACT

Disclosed are stable, homogeneous $GeO_2$-$B_2O_3$-PbO-$Bi_2O_3$ glass compositions having high indices of refraction, low sound velocities, low acoustic loss and high Verdet constants which render them useful in acoustooptic and magnetooptic devices.

12 Claims, 3 Drawing Figures

LEAD-BISMUTH GLASSES FOR ACOUSTOOPTIC AND MAGNETOOPTIC DEVICES

Communications systems of the future will involve the tremendous information carrying capacity of the laser beam and other types of electromagnetic radiation. To accomplish effective transmission of information, there is a need for materials and techniques capable of modulating such electromagnetic radiation. Accordingly, there has been a great deal of research and development on magnetooptic and acoustooptic materials to accomplish these results.

Glass, glass-ceramic and crystalline material of high indices of refraction have been found to possess properties useful in those magnetooptic and acoustooptic applications. In the case of acoustoopic modulators the figure of merit increases with the seventh power of index of refraction. Magnetooptic modulators (e.g. Faraday rotators) must also have high indices of refraction when the magneto-optic element is diamagnetic because they contain dense and highly polarizable ions such as $Pb^{+2}$, $Bi^{+3}$, $Sb^{+3}$, $Te^{+4}$ and the like.

Acoustooptical devices (also sometimes calles elastooptical devices), are well known in the art and reference is made to an article entitled, "A Review of Acousto-optical Deflection and Modulation Devices" by E. I. Gordon, which appeared in the Proceedings of the I.E.E.E. [10] 1391–1401 (1966) and an article entitled, "Dielectric Materials for Electrooptic, Elastooptic and Ultrasonic Device Application" by E. G. Spencer et al., appearing in the Proceedings of the I.E.E.E., 55 [12] 2074–2108 (1967). U.S. Pat. Nos. 3,671,103; 3,419,322; 3,586,120; 3,617,931; 3,852,077; and 3,653,746 also concern this type of device.

Such acoustooptic devices are particularly advantageous in use with laser devices for modulation, deflection, etc. of laser beams. However, it is also apparent that such devices have other application.

The present invention provides an acoustooptic device wherein transparent $GeO_2$-$B_2O_3$-PbO-$Bi_2O_3$ glass elements are used as acoustooptical modulators, laser Q-switches and/or deflectors, and like application.

As indicated in the above-referenced article to Gordon, the proper combination of material parameters for determining optimum device performance, designated herein as figure of merit (FOM), is as follows:

$$FOM = \frac{n^7 p^2}{\rho v} \quad (1)$$

where:

$n$ equals the index of refraction.

$p$ equals a component of a photoelastic tensor, $\rho$ equals mass density and $v$ equals the sound wave velocity. Thus a high index of refraction, and low sound wave velocity are important. In that the index of refraction is raised to the seventh power it is quite important. The glass must also have good melting and forming characteristics so that the glass element of optical quality can be formed in a vitreous, homogeneous seed-free condition.

As indicated above, and as indicated in the articles referenced herein above, one type of acoustooptical device, is a package of device consisting of a block of solid material having means for introducing an elastic pressure wave into the block and means for rotating the relative orientation of the block relative to a beam of collimated light, preferably monochromatic light in the visible and/or infrared region of the spectrum.

In accordance with the present invention, transparent $GeO_2$-$Bi_2O_3$-PbO-$B_2O_3$ glasses which are transparent in the visible and/or infrared region of the electromagnetic spectrum are suitable for the purposes of the invention are particularly suited for these acoustooptic purposes.

In regard to the magnetooptic applications, the $GeO_2$-$Bi_2O_3$-PbO-$B_2O_3$ glasses of invention have a high Verdet constant and are adapted to exhibit Faraday rotation in devices such as isolators and shutters operating in the visible and infrared region of the electromagnetic spectrum.

Such Faraday rotator devices include a source of polarized electromagnetic radiation, glass magnetoopic element capable of affecting Faraday rotation, a source for inducing a magnetic field in the magnetooptic element for rotating the electromagnetic radiation within the glass element. The glass element must have an unusual balance of desired properties including a high Verdet constant, high transmission in the wavelength of interest, good melting and forming properties so that the glass element of optical quality can be melted and formed in a vitreous, homogeneous, seed-free condition.

These and other advantages are obtained by providing a homogeneous glass composition having an index of refraction of at least about 2.1, a longitudinal sound velocity of less than about 4mm/$\mu$sec, an acoustic loss of less than about 6 db/cm at 20 MHz, a Verdet constant greater than about 0.1 min/Oe-cm at 0.63 $\mu$m and an optical loss of less than about 10%/cm when measured at a wavelength between 1 and 2 $\mu$m said glass consisting essentially of:

| Component | Mole % |
| --- | --- |
| $GeO_2$ | 5–32 |
| $B_2O_3$ | 1.5–18 |
| PbO | 30–60 |
| $Bi_2O_3$ | 10–41 | wherein $$1 \leq \frac{PbO}{Bi_2O_3} \leq 6$$

Preferably the glass composition has the ratio of about $1 \leq PbO/Bi_2O_3 \leq 3$ for glass stability and resistance to devitrification. In the most preferred compositions the ratio of PbO/$Bi_2O_3$ is about 2. The $B_2O_3$ is used in a stabilizing proportion within the limits specified with higher proportions of $B_2O_3$ being required when the PbO/$Bi_2O_3$ ratio increases or decreases from about 2.

Preferably for ease of melting the compositions consist essentially of:

| Component | Mole % |
| --- | --- |
| $GeO_2$ | 9–30 |
| $B_2O_3$ | 2–15 |
| PbO | 34–54 |
| $Bi_2O_3$ | 20–35 |

The glass compositions contains significant proprtions of $PbO + Bi_2O_3$ (i.e. $\geq 65$ mole %) to achieve high index of refraction values while achieving glass stability against devitrification by contaning minor but important proportions of $B_2O_3$ and $GeO_2$. The index of refraction tends to increase with increasing proportions of $PbO+Bi_2O_3$ but this causes the glass to become less stable. Accordingly more $B_2O_3$ is required as the $PbO+Bi_2O_3$ increases. Thus higher proportions of $B_2O_3$ are required for stabilization against devitrification as the $Bi_2O_3+PbO$ increases.

The optimum ratio of $PbO/Bi_2O_3$ is about 2 for stability against devitrification. For instance when the $PbO/Bi_2O_3$ is about 2 and the $Bi_2O_3+PbO$ is about 69%, the proportion of $B_2O_3$ required for stabilization is less than 2%. It will be understood from the Examples that more $B_2O_3$ is required for stabilization as the $PbO/Bi_2O_3$ ratio increases or decreases from 2 and/or the $Bi_2O_3+PbO$ content increases. The ratio of $PbO/Bi_2O_3$ of about 2 forms the most stable glass compositions and for this reason is generally preferred.

Lead bismuth glasses and glass-ceramics have been studied in the past as indicated in U.S. Pat. No. 3,480,566 and the articles entitled, "Unusual Properties and Structure of Glasses in the Systems $Bi_2O_3$-$B_2O_3$-SrO; $Bi_2O_3$-$B_2O_3$-BaO; $Bi_2O_3$-$B_2O_3$-ZnO and $Bi_2O_3$-$B_2O_3$-PbO" by Bh. V. Janakirama-Rao, International Congress on Glass VII, Vol. 1, 104–1 - 104–6 (1965); "Optical Materials: Glasses and Glass-Ceramics" by Dr. Gail P. Smith, Optical Spectra, (1969) Part 2, pp. 33–37; "Bismuth Trioxide Glasses" by M. S. R. Heynes and H. Rawson, Journal of the Society of Glass Technology, pp. 347T–349T; "The Systetm $Bi_2O_3$-$B_2O_3$" by E. M. Levin and C. L. McDaniel, Journal of the American Ceramic Society, Vol. 45, No. 8 (1962) pp. 355–360; and "Correlation of Refractive Index and Density in Oxide Glasses of High Refractive Index" by A. N. Tiwari and A.R. Das, American Ceramic Soc. Bull. Vol. 51, No. 9 (1972) pp. 695–697.

In addition to these references, U.S. Pat. No. 3,723,141 discloses lead bismuth glasses for transmitting infrared radiation. The glasses are said to contain substantial proportions of barium and zinc. U.S. Pat. No. 2,853,393 concerns high index glass elements comprising certain lead bismuth glasses which can contain $B_2O_3$, $SiO_2$, $P_2O_5$, and $GeO_2$. U.S. Pat. No. 2,713,286 discloses lead bismuth borophosphate glasses for reflect light reflectors. British Pat. No. 776,784 discloses lead borate glasses which contain tellurium dioxide to achieve X-radiation absorbing properties. None of these references suggest the specified combination of PbO and $Bi_2O_3$ together with $B_2O_3$ and $GeO_2$ to achieve glass stability as well as the desired acoustooptic and magnetooptic properties disclosed herein.

The invention will be described with reference to the accompanying drawing wherein.

Figure 1:
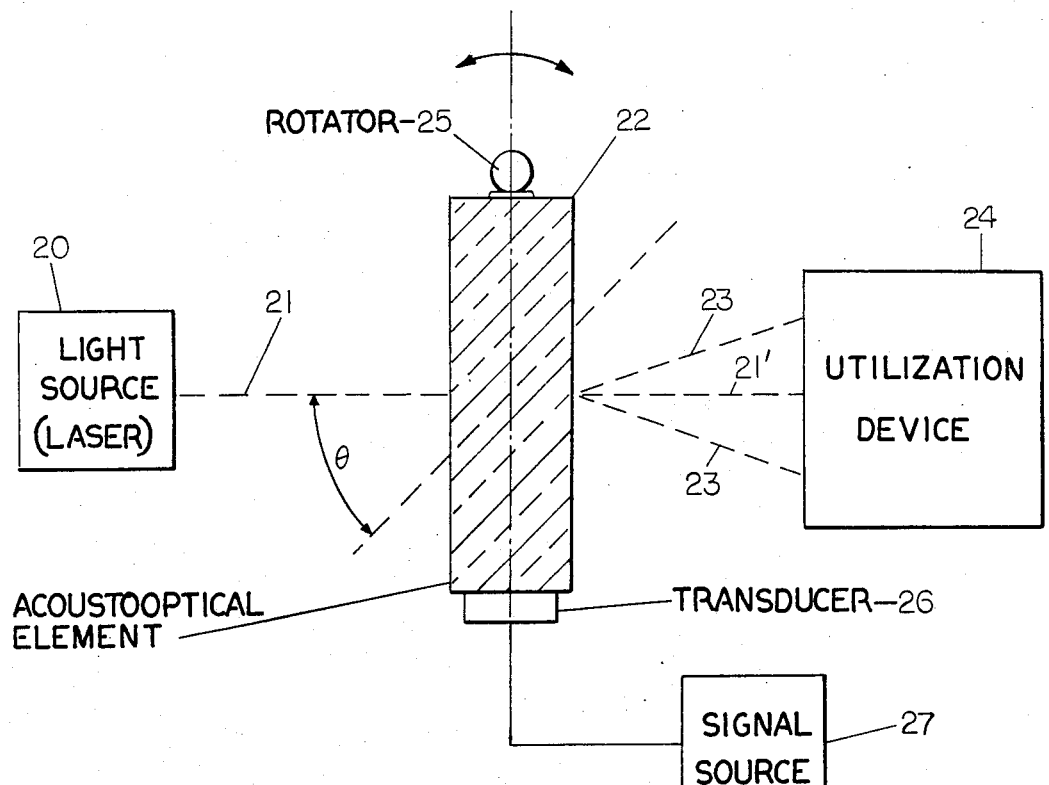
FIG. 1 is a schematic representation of an acoustooptical (elastooptical) device for modulating the direction, phase, amplitude and/or frequency of light in accordance with the invention.

Referring now to FIG. 1, the light source 20 can be a laser or other monochromatic light source having a beam path indicated by the numeral 21 in the drawing but which can be set at the Bragg Angle $\theta$. Interposed in the path of beam 21 is an acoustooptical element in the shape of a rectangular block 22 of the glass composition described. After passing through the element 22, the deflected light beam designated 23 is applied to a detection device or utilization device 24.

The acoustooptical element 22 is shown as having at its upper end a mechanism 25 for rotating the element in the plane thereof as well as pivoting the element toward to at least about the Bragg Angle and away from the source 20 about a fixed pivot axis offset from the axis of beam 21. The acoustooptical element 22 has affixed thereto a transducer member 26 which is excited from a signal source 27 which can be in the ultrasonic, or radio frequency (RF) range. Usually the frequency of the sonic beam is in the kilohertz to gigahertz range with most applications being in the 10 to 500 megahertz.

As is conventional, the acoustic energy co-acts with the energy of the light beam within the acoustooptical body member 22 to thereby affect or modulate the optical transmission properties of the element with respect to the light energy. Thus, the acoustic energy creates what has been described by others as a moving optical transmission grating which diffracts the light beams crossing the sonic beam at near perpendicular incidence.

It will also be appreciated that the acoustooptical glass element 22 can be oriented with respect to the axis of beam 21 so that it lies at some angle other than perpendicular to the axis of beam 21 as well as other than the Bragg Angle. Thus, the body member can be oriented such that it is at Brewster's angle relative to the light beam to thereby minimize the effect of misorientation, and poor surface geometry of the acoustooptical element 22 with respect to the axis of beam 21 to thereby enhance and improve the operating efficiency thereof. Thus, by varying the properties of the acoustic energy wave in the medium, e.g., pulsing on and off, amplitude, etc., as well as the angular orientation of the acoustic beam with respect to an incident light beam, the device may be used as a phase, frequency or intensity modulator, a light switch, or a beam deflector, etc. Moreover, as is apparent from the above discussion, the device can be used in information processing systems and the like.

Figure 2:
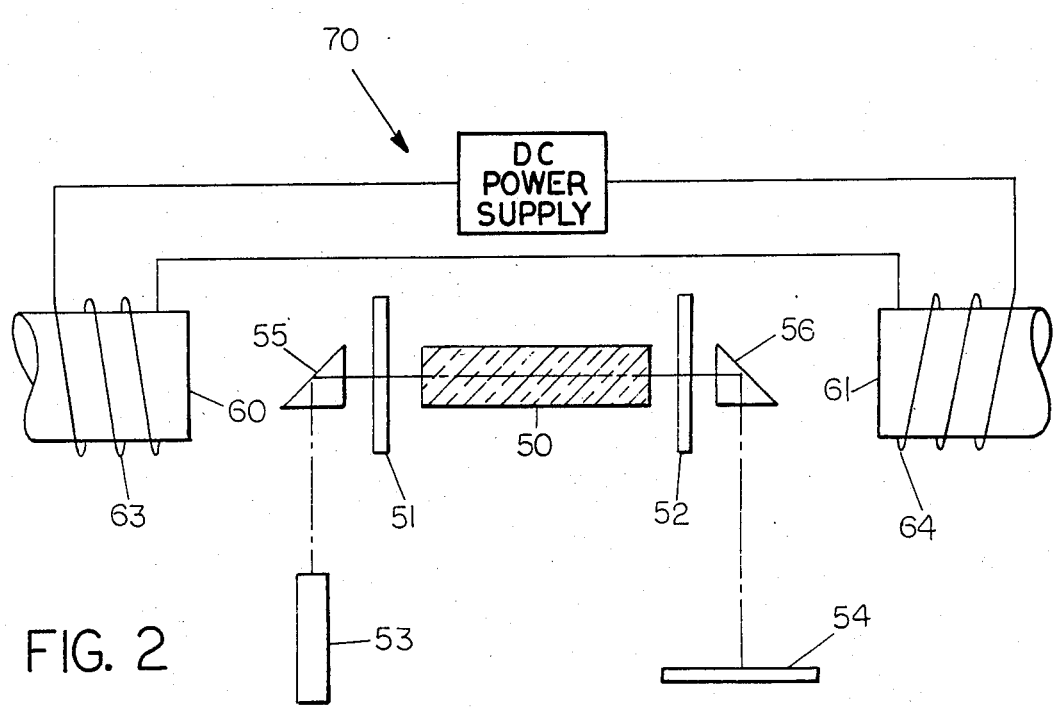
FIG. 2 is a schematic illustration of a magnetooptic device known in the art as a Faraday rotator.

FIG. 2 schematically illustrates a Faraday rotator device emboding the magnetooptical glass element of invention which is indicated by reference numeral 50. Element 50 is optically transposed between a polarizer 51 and an analyzer 52 which are conventional polarizing sheet materials. Analyzer 52 is rotatable to achieve extinction of the polarized beam from polarizer 51.

Positioned adjacent polarizer 51 is prism 55 which is in optical alignment with a source of light in the form of laser 53 so that a beam from laser 53 will pass through polarizer 51 and into magnetoopic element 50. Positioned adjacent analyzer 52 is prism 56 which is optically aligned to direct the beam passing through analyzer 52 to a detection device or utilization device 54.

Magnetoopic element 50 is positioned in the field of electromagnet 70 having steel poles 60 and 61 so that the field has a component in the direction of propagation of the beam through the element. Poles 60 and 61 are provided with conductive coils 63 and 64 which are electrically connected to a variable DC power supply having the capability of varying the magnetic field between poles 60 and 61 from 0 to 10,000 Oersteds.

In operation laser 53 is a helium-neon laser admitting a beam of radiation at 0.6328 micrometers. The laser beam is directed through the prism 55 through the magnetooptic element 50 through prism 53 and onto detection device 54. The polarizer 51 and analyzer 52 are set in the "cross" position so that no beam reaches detection device 54. The power source is then actuated in stepwise fashion to impress various magnetic field strengths across the magnetooptic element 50. The analyzer is rotated at each field strength to extinction to measure the angle that the polarized laser beam is rotated by the magnetic field acting upon glass element 50. A graph is then made of the angle of rotation as a function of the magnetic field in Oersted. The slope of this line is a measure of the Verdet constant.

Other types of Faraday rotators which can employ the element of the present invention are shown in U.S. Pat. Nos. 3,484,152; 3,318,652; 3,368,861; 3,516,726; 3,629,773; and in the articles "A Faraday Effect Optical Isolator" by L. J. Aplet and J. W. Carson, Applied Optics, Vol. 3, No. 4 (1964) pp. 544–545, and "Magneto-optic Effects in Glass, Part I," by H. Cole, Soc. Glass. Tech. Journal, Vol. 34, (1950) pp. 220 – 237.

In the Examples that follow all percentages are mole percentages and all temperatures are in °C unless stated otherwise.

Exemplary glasses in the $PbO-Bi_2O_3-B_2O_3-GeO_2$ field are shown in Table I.

Glass melts of approximately 500 to 1200 grams are made from conventional batch materials (e.g. germanium dioxide, bismuth trixoide, lead oxide, and anhydrous boric acid) in refractory magnesia-stabilized zirconium oxide crucibles in an air atmosphere at temperatures ranging from 700°C to 870°C in an electrically heated furnace with occasional stirring to assure homogeneity. These glasses are quite fluid and only 1–4 hours are required to satisfactorily melt and refine the glasses.

A portion of each melt is quenched between metal plates at room temperature. The balance of the melt is then poured into a mold to form ⅜ × 2 × 3 inch slabs. Samples for optical transmission and magnetic and acoustic measurements are prepared from these slabs.

The indices of refraction ($n_D$) are measured by an immersion technique in standard index oils. The highest index of refraction oil available at the time of measurement is 2.31 so many glasses are reported as having an index of refraction ">2.31". The Verdet constant (minutes of arc of rotation/Oe-cm) is measured as described above using a He-Ne laser beam at 0.6328 $\mu$m at room temperature.

Sound velocity and acoustic loss ($A_l$) measurements in decibels per cm are made at room temperature using McSkimins's pulse-echo technique [see "Pulse Super Position Method for Measuring Ultrasonic Wave Velocities in Solids" J. Acoust. Soc. Amer. Vol. 33, (1) pp. 12–16 (1961)]. Twenty MHz x-cut or y-cut quartz transducers bonded with phenyl benzoate adhesive are employed for longitudinal ($V_l$) and shear ($V_s$) wave measurements, respectively. Velocity data are accurate within ±1% of the stated values.

The following criteria is utilized to rate the stability and glass-formation tendencies:

Rating
1. Stable enough to pour good quality ⅜ × 2 × 3 inch slabs.
2. Good: Quenched plates could easily be obtained having no uncontrolled devitrification.
3. Fair: Quenched plates could be obtained having some uncontrolled devitrification.
4. Poor: Quenched plates had only small areas of glass.
5. No glass formation.

TABLE I

| | 1 | 2 | 3 | 4 | 5 | 6 | 7 | 8 | 9 |
|---|---|---|---|---|---|---|---|---|---|
| Mole % | | | | | | | | | |
| $GeO_2$ | 29.0 | 28.0 | 25 | 12.5 | 7 | 12 | 9.5 | 15.4 | 15.5 |
| $Bi_2O_3$ | 23.1 | 23.1 | 23.1 | 25 | 27 | 27 | 27 | 23.1 | 30 |
| PbO | 46.1 | 46.1 | 46.1 | 50 | 54 | 54 | 54 | 46.1 | 39 |
| $B_2O_3$ | 1.8 | 2.8 | 5.8 | 12.5 | 12 | 7 | 9.5 | 15.4 | 15.5 |
| $Bi_2O_3$+PbO | 69.2 | 69.2 | 69.2 | 75 | 71 | 81 | 81 | 69.2 | 69 |
| $\frac{PbO}{Bi_2O_3}$ | 2 | 2 | 2 | 2 | 2 | 2 | 2 | 3 | 1.3 |
| Glass Stability Rating | 1 | 1 | 1 | 1 | 1 | 2 | 1 | 1 | 1 |
| $n_D$ | 2.30 | 2.30 | 2.26 | 2.173 | >2.31 | >2.31 | >2.31 | 2.14 | 2.154 |
| $A_l$, db/cm | | | | | | | | | |
| 20 MHz | 4.32 | 3.43 | 5.81 | 3.30 | 2.83 | 3.22 | 2.53 | 4.50 | 2.23 |
| 40 | | | | | | | | 18 | 18.2 |
| 60 | | | | | | | | 17 | |
| 100 | | | | | | | | | |
| $A_s$, db/cm | | | | | | | | | |
| 20 MHz | | | | | | | | | |
| $V_l$, mm/$\mu$sec | 2.909 | 2.857 | 3.7241 | 2.796 | 2.686 | 3.155 | 2.683 | 2.8707 | 2.9794 |
| $V_s$, mm/$\mu$sec | | | | | | | | | |
| $\rho$, g/cc (density) | | | | | | | | | |
| Verdet constant min/Oe-cm at 0.6328$\mu$m | 0.126 | 0.176 | 0.180 | | | | | 0.196 | 0.161 |

| | 10 | 11 | 12 | 13 | 14 | 15 | 16 | 17 | 18 | 19 |
|---|---|---|---|---|---|---|---|---|---|---|
| Mole % | | | | | | | | | | |
| $GeO_2$ | 25 | 28 | 22 | 9.5 | 15.5 | 22.0 | 12.5 | 5 | 29.0 | 25.0 |
| $Bi_2O_3$ | 30 | 30 | 30 | 35 | 34.5 | 34.5 | 37.5 | 40.5 | 11.0 | 11.0 |
| PbO | 39 | 39 | 39 | 46 | 34.5 | 34.5 | 37.5 | 40.5 | 58.0 | 58.0 |
| $B_2O_3$ | 6 | 3 | 9 | 9.5 | 15.5 | 9.0 | 12.5 | 14 | 2.0 | 6.0 |
| $Bi_2O_3$+PbO | 69 | 69 | 69 | 81 | 69 | 69 | 75 | 81 | 69 | 69 |
| $\frac{PbO}{Bi_2O_3}$ | 1.3 | 1.3 | 1.3 | 1.3 | 1 | 1 | 1 | 1 | 5.3 | 5.3 |
| Glass Stability Rating | 1 | 2 | 1 | 2 | 1 | 2 | 2 | 2 | 2 | 1 |
| $n_D$ | >2.31 | 2.303 | 2.303 | >2.31 | 2.272 | 2.302 | >2.31 | >2.31 | 2.173 | 2.222 |

TABLE I-continued

|  | 1 | 2 | 3 | 4 | 5 | 6 | 7 | 8 | 9 |
|---|---|---|---|---|---|---|---|---|---|
| $A_l$, db/cm |  |  |  |  |  |  |  |  |  |
| 20 MHz | 5.18 | 4.10 | 2.93 | 3.73 | 2.85 | 2.45 | 3.09 | 5.10 | 2.97 | 2.55 |
| 40 |  |  |  |  |  |  |  |  |  |
| 60 |  |  |  |  |  |  |  |  |  |
| 100 |  |  |  |  |  |  |  |  |  |
| $A_s$, db/cm |  |  |  |  | 8.11 |  |  |  |  |
| 20 MHz |  |  |  |  |  |  |  |  | 6.09 |
| $V_l$, mm/μsec | 2.944 | 2.676 | 2.911 | 2.634 | 2.978 | 2.934 | 2.871 | 2.756 | 2.768 | 2.783 |
| $V_s$, mm/μsec |  |  | 1.604 |  | 1.643 |  |  |  |  | 1.527 |
| ρ, g/cc (density) |  |  | 7.11 |  |  |  |  |  |  |  |
| Verdet constant min/Oe-cm at 0.6328 μm |  |  |  |  |  |  |  |  |  |

As is apparent from the foregoing data, the homogeneity and stability of the glasses against devitrification is significantly increased by the combination of $GeO_2$ and $B_2O_3$. These ingredients provide for increasing the proportions of PbO and $Bi_2O_3$ while still achieving a homogeneous, vitreous glass of high index of refraction. The minimum amount of $B_2O_3$ necessary to obtain these stable glasses at various $PbO/Bi_2O_3$ mole ratios is indicated in the data in the examples.

The most stable glasses are obtained when the ratio of $PbO/Bi_2O_3$ is about 2. When this ratio approaches 1, the glass stability is improved by increasing the proportion of $B_2O_3$ to at least about 15%.

For instances, the glass of Examples 1 and 2 are preferred embodiments and have a mole ratio of $PbO/Bi_2O_3$ of 2, are quite stable (i.e. have a glass stability rating of 1) with a $B_2O_3$ content of 1.8 and 2.8 respectively. Examples 3 through 7 show other glasses with $PbO/Bi_2O_3$ ratios of 2 with various proportions of PbO, $Bi_2O_3$, $GeO_2$, and $B_2O_3$.

Example 8 shows a stable glass with a $PbO/B_2O_3$ ratio of 3.

Examples 9, 10, 11, and 12 show glasses with a mole ratio of $PbO/Bi_2O_3$ of 1.3 and various stabilizing proportions of $B_2O_3$. Example 11 has only 3% $B_2O_3$ and yet the glass stability rating is 2. Example 13 has a $PbO/Bi_2O_3$ ratio of 1.3 with the $Bi_2O_3+PbO$ level of 81%. This high content of $Bi_2O_3+PbO$ requires a higher proportion of $B_2O_3$ for stability.

Examples 14 through 17 illustrate glasses with a $PbO/Bi_2O_3$ ratio of 1 stabilized with various proportions of $B_2O_3$.

Examples 18 and 19 illustrate glasses with a $PbO/Bi_2O_3$ ratio of 5.3. In these glasses a stability rating of 2 is achieved with only 2.0% $B_2O_3$ in Example 18 and a rating of 1 is achieved in Example 19 with 6% $B_2O_3$.

Some minor experimentation in adjusting the contents of $B_2O_3$ and $GeO_2$ within the specified ranges may be required to optimize the stability at any given level of $Bi_2O_3+PbO$.

All of the glass in the numbered examples are clear and homogeneous and are useful in the acoustooptic device shown in FIG. 1 and the magnetooptic device shown in FIG. 2.

The foregoing data also indicates substitution of $B_2O_3$ for $GeO_2$ decreases the index of refraction. However, this substitution increases the stability of the glass to such an extent that stable glasses can also be obtained with a lower total amount of $GeO_2$ and $B_2O_3$. This permits an increase in the PbO and $Bi_2O_3$ to levels which more than compensates for the decrease in the index resulting from the $B_2O_3$ for $GeO_2$ substitution. Glasses having indices of refraction greater than 2.1 are obtained.

The table includes the sound velocity and acoustic loss or attenuation for several of the more stable glasses. For acoustooptical applications, these two properties should be as low as possible. The longitudinal sound velocity, $V_l$, ranges from about 2.6–3.7 mm/μsec. These low sound velocities are sometimes accompanied by moderately high acoustic attenuations, $A_l$, with ranges 2.5–6.0 db/cm at 20 MHz and 17–18 db/cm at 100 MHz.

The Verdet constants are all positive, for the diamagnetic glasses of invention and are exceptionally large, being as high as about 0.20 min/Oe-cm (For Example 7).

Figure 3:
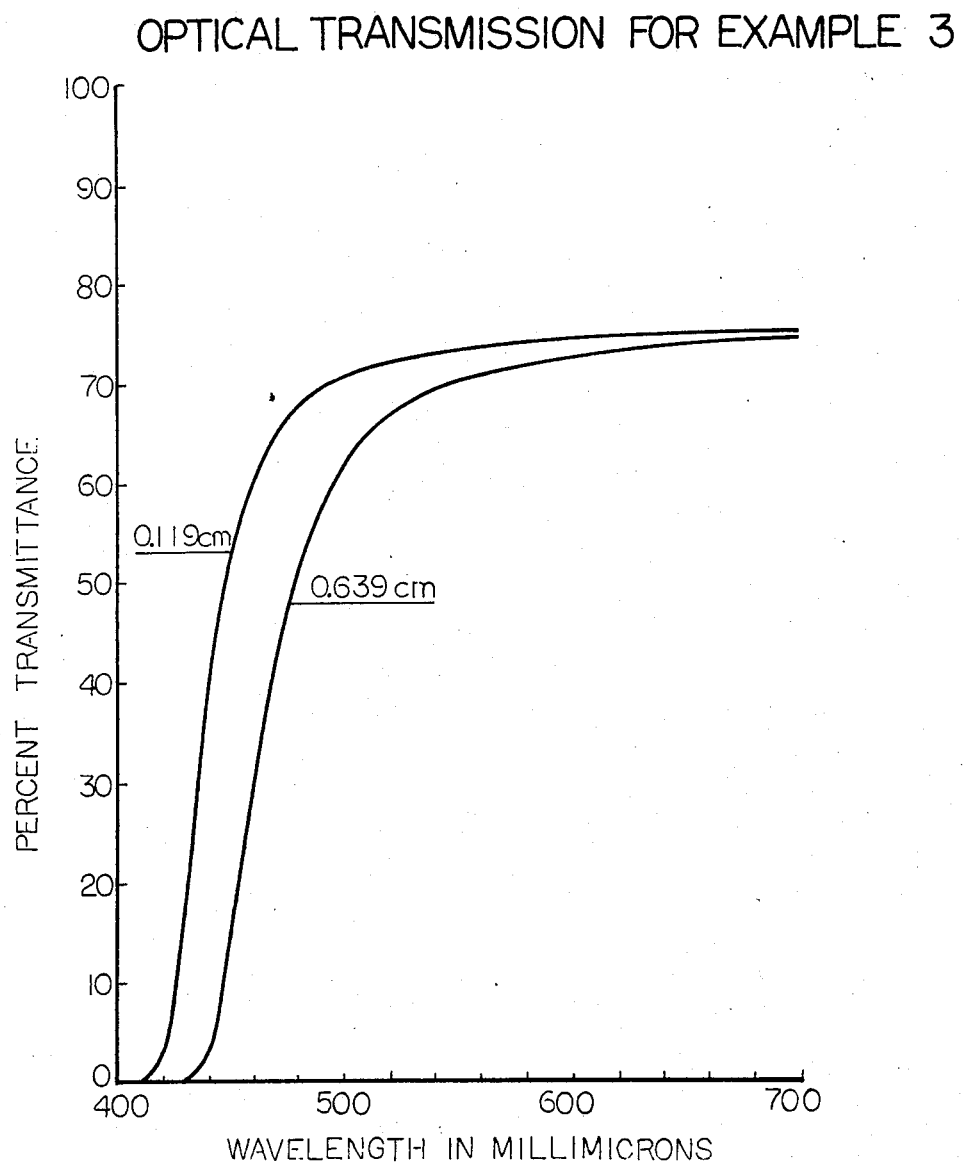
FIG. 3 is a plot of the optical transission versus wavelength for a glass of invention.

The optical transmission of the glass of Example 3 measured over the wavelength of 400 to 700 millimicrons (i.e. the visible range) for two different sample thicknesses and is shown in the graph of FIG. 3. Most of the loss can be attributed to surface reflection due to the high index of refraction.

To further determine the optical absorption of the glass itself, a differential transmission test is performed on a Cary spectrophotometer. In this test, two samples of different thickness of the glass of Example 3 are tested together so that the transmission of one glass sample can be compared to the transmission of the other sample. The only difference in transmission is due to the difference in sample thicknesses. This result indicates that the absorption of the glass is less than about 2% 1cm between 1.0% and 2.0 μm which is the limit of detection of the Cary spectrophotometer used in the evaluation. This loss is acceptable for many magnetooptic and acoustooptic applications.

For convenience in discosure, all patents and publications mentioned herein are incorporated by reference.

Having thus described the invention, what is claimed is:

1. A homogeneous glass composition having an index of refraction of at least about 2.1, a longitudinal sound velocity of less than about 4 mm/μsec, an acoustic loss of less than about 6 db/cm at 20 MHz, a Verdet constant greater than about 0.10 min/Oe-cm at 0.63μm and an optical loss of less than about 10% cm when measured at a wavelength between 1 and 2μm said glass consisting essentially of:

| Composition | Mole % |
|---|---|
| $GeO_2$ | 5–32 |
| $B_2O_3$ | 1.5–18 |
| PbO | 30–60 |

-continued

| Composition | Mole % |
| --- | --- |
| $Bi_2O_3$ | 10–41 | wherein:

$$Bi_2O_3 + PbO \geq 65\% \text{ mole}$$

and $$1 \leq \frac{PbO}{Bi_2O_3} \leq 6.$$

2. The glass composition of claim 1 wherein $1 \leq PbO/Bi_2O_3 \leq 3$.

3. The glass composition of claim 1 wherein $PbO/Bi_2O_3$ is about 2.

4. The glass composition of claim 1 which consists essentially of:

| Component | Mole % |
| --- | --- |
| $GeO_2$ | 9–30 |
| $B_2O_3$ | 2–15 |
| PbO | 34–54 |
| $Bi_2O_3$ | 20–35. |

5. In a device for the acousto-optical modulation of a beam of electromagnetic radiation comprising a glass element, means for propagating longitudinal sonic wave through said element in a propagating a beam of electromagnetic radiation through said element in a predetermined direction so as to cause deflection of said beam by acousto-optical interaction with the sonic waves, the improvement wherein said glass element has the composition of claim 1.

6. In a device for the acousto-optical modulation of a beam of electromagnetic radiation comprising a glass element, means for propagating longitudinal sonic wave through said element in a predetermined direction, and means for propagating a beam of electromagnetic radiation through said element in a predetermined direction so as to cause deflection of said beam by acousto-optical interaction with the sonic waves, the improvement wherein said glass element has the composition of claim 2.

7. In a device for the acousto-optical modulation of a beam of electromagnetic radiation comprising a glass element, means for propagating longitudinal sonic wave through said element in a predetermined direction, and means for propagating a beam of electromagnetic radiation through said element in a predetermined direction so as to cause deflection of said beam by acousto-optical interaction with the sonic waves, the improvement wherein said glass element has the composition of claim 3.

8. In a device for the acousto-optical modulation of a beam of electromagnetic radiation comprising a glass element, means for propagating longitudinal sonic wave through said element in a predetermined direction, and means for propagating a beam of electromagnetic radiation through said element in a predetermined direction so as to cause deflection of said beam by acousto-optical interaction with the sonic waves, the improvement wherein said glass element has the composition of claim 4.

9. In a Faraday rotator comprising a light rotating glass element, means for directing a beam of polarized light through said element, means for impressing a magnetic field on said element, said field having a component in the direction of propagation of the light through the element, means for detecting the light transmitted through said element, the improvement wherein said light rotating glass element has the composition of claim 1.

10. In a Faraday rotator comprising a light rotating glass element, means for directing a beam of polarized light through said element, means for impressing a magnetic field on said element, said field having a component in the direction of propagation of the light through the element, means for detecting the light transmitted through said element, the improvement wherein said light rotating glass element has the composition of claim 2.

11. In a Faraday rotator comprising a light rotating glass element, means for directing a beam of polarized light through said element, means for impressing a magnetic field on said element, said field having a component in the direction of propagation of the light through the element, means for detecting the light transmitted through said element, the improvement wherein said light rotating glass element has the composition of claim 3.

12. In a Faraday rotor comprising a light rotating glass element, means for directing a beam of polarized light through said element, means for impressing a magnetic field on said element, said field having a component in the direction of propagation of the light through the element, means for detecting the light transmitted through said element, the improvement wherein said light rotating glass element has the composition of claim 4.

* * * * *